3,391,140
13-LOWER ALKYL-GONA-$\Delta^{5(10)8(14)}$-DIEN-3-ON-17$\beta$-OL AND PROCESS FOR THE PREPARATION THEREOF
David Taub, Metuchen, N.J., assignor to Merck & Co., Rahway, N.J., a corporation of New Jersey
No Drawing. Filed Dec. 28, 1965, Ser. No. 517,104
20 Claims. (Cl. 260—239.55)

ABSTRACT OF THE DISCLOSURE

The invention disclosed herein is concerned with a novel synthesis of novel intermediate compounds useful in the synthesis of known steroids of the estrane series which have utility in the pharmaceutical field as gonadotrophin inhibiting agents and which also have progestational activity. More particularly, this invention relates to the synthesis of 17α-chloroethynyl-13β-lower alkylgona-4,9,8(14)-trien-17β-ol-3-one steroids, such as 17α-chloroethynyl-19-nor-4,9,8(14)-androstatrien-17β-ol-3-one, and to 3-substituted oxy-13β-lower alkylgona-2,5(10),8(14)-trien-17β-ol or 17-keto steroids (Compound II), and 3-keto-13β-lower alkylgona-5(10),8(14)-dien-17β-ol or 17-keto steroids (Compound III) in which the 17-keto group of Compounds II and III may be protected by the formation of an acetal or ketal group, such as a 17,17-ethylenedioxy group. In this synthesis, 3-alkoxy-13β-lower alkylgona-1,3,5(10),8,14-pentaen-17β-ol is reacted with lithium and liquid ammonia thereby forming 3-alkoxy-13β-lower alkylgona-2,5(10),8(14)-triene-17β-ol which, upon treatment with organic acid in an organic solvent, is converted to the corresponding 3-keto-$\Delta^5(10)$-derivative; the latter compound is reacted with pyridine perbromide hydrobromide in pyridine solution thereby forming the corresponding 3-keto-13β-lower alkylgona-4,9,8(14)-triene-17β-ol; chromic acid oxidation of this last-named compound results in the formation of the corresponding 17-ketone which upon reaction with lithium chloroacetylide is converted to the desired 17α-chloroethynyl-13β-lower alkylgona-4,9,8(14)-triene-17β-ol-3-one.

The novel synthesis of this invention, in which the starting material is a 3-substituted oxy-13β-lower alkylgona-1,3,5(10),8,14-pentaen-17β-ol or 17-keto steroid in which the 17-keto group may be protected by the formation of an acetal or ketal, such as by the formation of a 17,17-ethylenedioxy group (Compound I), may be schematically represented as follows, wherein $R_1$ is a lower alkyl or cycloaliphatic substituent, preferably having not more than five carbon atoms, or a heterocyclic substituent, such as a tetrahydropyranyl group; $R_2$ is a lower alkyl radical; $R_3$ is a β-hydroxy or keto group or an acetal or ketal group, preferably a 17,17-ethylenedioxy group, and $R_4$ is a β-hydroxy, acetal or ketal group.

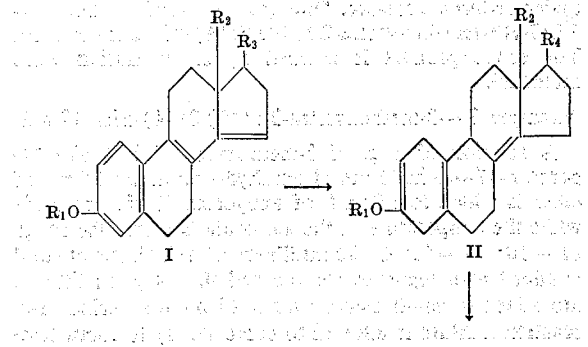

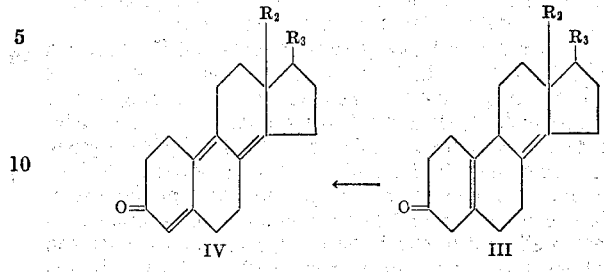

The first step in the novel synthesis of this invention is the reduction of Compound I with an alkali metal, preferably lithium, in liquid ammonia. The reduction is accomplished by adding a solution of Compound I in a suitable solvent, such as a mixture of tetrahydrofuran and ether, to liquid ammonia, which is maintained at a temperature of from about —50° to —60° C. An anhydrous lower aliphatic alcohol, such as ethanol, is added with vigorous stirring to a solution in liquid ammonia and after the addition is complete, additional alkali metal is added gradually in small portions. After a few minutes an additional amount of alcohol is added. The temperature of the reaction mixture is allowed to come slowly to room temperature and the ammonia is allowed to evaporate. Water is added to the residue and most of the alcohol is removed from the reaction mixture by distillation under reduced pressure. The concentrate is extracted with a suitable solvent, such as chloroform, the extract is washed with saturated aqueous sodium chloride solution, dried over magnesium sulfate, filtered, and concentrated to dryness under reduced pressure. The residue of Compound II may be recrystallized from a suitable solvent, such as methanol or a methanol-water solution.

If Compound I has a 17-keto group, reduction with an alkali metal in liquid ammonia to provide Compound II results in reduction of the 17-keto group to provide a 17β-hydroxy group.

The second step in the synthesis is the splitting of any 3-substituted oxy linkage which may be present in Compound II and the simultaneous conversion of the resulting enol form of the A-ring to the keto form to provide compound III. This may be accomplished by adding a solution of oxalic acid to a solution of Compound II in an organic solvent, preferably an organic solvent composed of tetrahydrofuran and methanol. The reaction mixture is allowed to stand for about one hour and then an excess amount, based on the organic acid present in the reaction mixture, of dilute aqueous potassium bicarbonate solution is added. The organic solvents are removed from the neutralized reaction mixture by distillation under reduced pressure. The residue is extracted with ether, the extract is washed with saturated aqueous sodium chloride solution, dried over magnesium sulfate, filtered, and concentrated to dryness under reduced pressure. The residue of Compound III may be crystallized from a suitable solvent, such as methanol or a methanol-water solution.

The third step in the reaction is the addition of bromine to the $\Delta^{5(10)}$-bond of Compound III and the elimination of two molecules of hydrogen bromide to provide Compound IV. This reaction may be accomplished by adding one molecular equivalent of bromide or pyridine perbromide hydrobromide to a solution of Compound III in pyridine and stirring the reaction mixture at room temperature for about two hours. Compound IV may be isolated by pouring the reaction mixture into ice water, extracting with ether, washing the ether extract with water, drying the extract over anhydrous sodium sulfate, filtering, and concentrating to dryness under reduced pressure. The residue of 13-lower alkylgona-4,9,8(14)-trien-17β-ol or one (Compound IV) which may have a 17-acetal or ketal group, may be purified by crystallization from a suitable solvent, such as methanol.

If $R_4$ is a β-hydroxy group in Compound II, if $R_3$ is a β-hydroxy group in Compounds III and IV, it may be oxidized to provide a 17-keto group by oxidizing any of Compounds II, III and IV with chromium trioxide under nonacidic conditions. Oxidation of the 17β-hydroxy group of Compounds II, III and IV may be accomplished by adding chromium trioxide in pyridine to a pyridine solution of the compound to be oxidized. The reaction mixture is allowed to stand overnight, poured into water and extracted with ether or a benzene-ether solvent. The organic solution is washed with water, dried over anhydrous magnesium sulfate, and filtered. The oxidation product is obtained as a residue by removing the solvent from the filtrate under reduced pressure. The oxidized product may be purified by passing an ether solution through a column of neutral alumina and eluting the product from the alumina with hot methanol. The oxidized product crystallizes from the cooled methanol solution.

The 17β-hydroxy group of Compounds II, III and IV may also be oxidized to provide a 17-keto group by adding a solution of the compound to be oxidized in a solvent, such as dry benzene or toluene, containing freshly distilled aluminum isopropoxide allowing the solution to stand under nitrogen for a few minutes and then adding cyclohexanone, followed by heating the reaction mixture on a steam bath. The oxidized product may be isolated by adding a saturated aqueous solution of Rochelle salts with vigorous shaking to the reaction mixture, extracting with ether, removing the ether by distillation under reduced pressure, and steam distilling the residual solution. The residue after steam distillation is extracted with ether, the ether extract is dried over magnesium sulfate, filtered, and concentrated to dryness under reduced pressure. The residue is the oxidized product containing a 17-keto group and may be purified in the same manner as described above in connection with oxidation by chromic acid solution.

In one modification of the process, Compound I has a 17-acetal or ketal group, such as a 17,17-ethylenedioxy group, which may be prepared from the 17-keto steroid. A 17,17-ethylenedioxy group is conveniently introduced by refluxing a solution of Compound I having a 17-keto group in benzene containing ethylene glycol and para-toluenesulfonic acid under nitrogen in a manner so that the water formed during the reaction is separated, such as by the use of a Dean-Stark water separator. When the reaction is complete, as evidenced by no further water formation, saturated aqueous sodium hydrogen carbonate solution is added to the cooled solution, the benzene layer is separated, washed and dried, and the benzene is removed by distillation under reduced pressure. The residue of Compound I having a 17,17-ethylenedioxy group may be crystallized from a suitable solvent, such as methanol or ethanol.

The 17-ketal or acetal group on any of Compounds II, III and IV may be removed to provide a 17-keto group, but this reaction, when applied to Compound II, also converts Compound II to Compound III. Removal of the 17-acetal or ketal group may be accomplished by heating a solution of the compound containing the 17-acetal or ketal group in aqueous acetic acid under nitrogen at a temperature of about 90° C. for a period of from one to four hours. After the heating period, the mixture is cooled, poured into ice water and the resulting mixture is extracted with a suitable solvent, such as ether or chloroform. The solvent layer is removed, the extract is washed with dilute aqueous potassium bicarbonate solution, washed with saturated aqueous sodium chloride solution, dried over magnesium sulfate, filtered, and concentrated to dryness under reduced pressure. The residual Compound III or IV having a 17-keto group may be crystallized from a suitable solvent, such as methanol.

A 13β - lower alkylgona - 4,9,8(14)-triene-3,17-dione may be converted to a 13β-lower alkylgona-4,9,8(14)-triene-17α-chloroethynyl - 17β - ol - 3 - one by selective chloroethynylation at the C-17 carbon atom by the use of sodium chloroacetylide in liquid ammonia, according to the disclosure in the Journal of Organic Chemistry, June 5, 1963, page 1707.

The following examples illustrate methods of carrying out the present invention, but it is to be understood that these examples are given for purposes of illustration and not of limitation.

Example 1.—3-methoxy-17,17-ethylenedioxyestra-2,5 (10),8(14)-triene

A solution of 1 g. of 3-methoxy-17,17-ethylenedioxyestra-1,3,5(10),8,14-pentaene in 25 ml. of tetrahydrofuran and 30 ml. of ether is added to 150 ml. of anhydrous liquid ammonia while the temperature of the ammonia is within the range of —50° to —60° C. Eighty milliliters of anhydrous ethanol is added with vigorous stirring and then 4 g. of lithium are added in small pieces over a 10 minute period. The reaction mixture is allowed to stand for 15 minutes and then 10 ml. of ethanol are added. The reaction mixture is allowed to come slowly to room temperature so that the ammonia evaporates overnight. One hundred milliliters of water are added to the residue and the mixture is concentrated to dryness under reduced pressure to remove most of the ethanol. The residual mixture is extracted with chloroform, the extract is washed with saturated aqueous sodium chloride solution, dried over magnesium sulfate, filtered, and concentrated to dryness under reduced pressure. One gram of crude 3-methoxy - 17,17 - ethylenedioxyestra - 2,5(10),8(14)-triene is obtained. The crude product is purified by crystallization from methanol.

Example 2.—3-methoxy-17,17-ethylenedioxyestra-2,5 (10),8(14)-triene

A solution of 1 g. of 3-methoxy-17,17-ethylenedioxyestra-1,3,5(10),8,14-pentaene in 50 ml. of tetrahydrofuran is added to 150 ml. of anhydrous liquid ammonia while the temperature of the ammonia is within the range of from —50° to —60° C. One hundred milliliters of tertiary-butanol is added with vigorous stirring and then 12 g. of sodium are added over a 15 minute period. The reaction mixture is allowed to stand for 20 minutes and then 15 ml. of tertiary-butanol are added. The reaction mixture is allowed to come slowly to room temperature so that the ammonia evaporates overnight. One hundred milliliters of water are added to the residue and the mixture is concentrated to dryness under reduced pressure to remove most of the solvent. The residual mixture is extracted with chloroform, the extent is washed with saturated aqueous sodium chloride solution, dried over magnesium sulfate, filtered, and concentrated to dryness under reduced pressure. One gram of crude 3-methoxy-17,17-ethylenedioxyestra-2,5(10),8(14)-triene is obtained. The crude product is purified by crystallization from methanol.

Example 3.—3-methoxyestra-2,5(10),8(14)-trien-17β-ol

A solution of 1 g. of 3-methoxyestra-1,3,5(10),8,14-pentaen-17-one in 25 ml. of tetrahydrofuran and 30 ml. of ether is added to 150 ml. of anhydrous liquid ammonia while the temperature of the ammonia is within the range of —50° to —60° C. 80 milliliters of anhydrous ethanol is added with vigorous stirring and then 4 g. of lithium are added in small pieces over a 10 minute period. The reaction mixture is allowed to come slowly to room temperature so that the ammonia evaporates overnight. One hundred milliliters of water are added to the residue and the mixture is concentrated to dryness under reduced pressure to remove most of the ethanol. The residual mixture is extracted with chloroform, the extract is washed with saturated aqueous sodium chloride solution, dried over magnesium sulfate, filtered, and concentrated to dryness under reduced pressure. One gram of crude 3-methoxyestra-2,5(10),8(14) - trien - 17β-ol is obtained which is purified by crystallization from methanol.

Example 4.—3-methoxyestra-2,5(10),8(14)-trien-17β-ol

A solution of 1 g. of 3-methoxyestra-1,3,5(10),8,14-pentaen-17β-ol in 25 ml. of tetrahydrofuran and 30 ml. of ether is added to 150 ml. of anhydrous liquid ammonia while the temperature of the ammonia is within the range of −50° to −60° C. 80 milliliters of anhydrous ethanol is added with vigorous stirring and then 4 g. of lithium are added in small pieces over a 10 minute period. The reaction mixture is allowed to come slowly to room temperature so that the ammonia evaporates overnight. One hundred milliliters of water are added to the residue and the mixture is concentrated to dryness under reduced pressure to remove most of the ethanol. The residual mixture is extracted with chloroform, the extract is washed with saturated aqueous sodium chloride solution, dried over magnesium sulfate, filtered, and concentrated to dryness under reduced pressure. One gram of crude 3-methoxyestra-2,5(10),8(14)-trien-17β-ol is obtained which is purified by crystallization from methanol.

Example 5.—3-methoxyestra-2,5(10),8(14)-trien-17-one

A solution of 300 mg. of 3-methoxyestra-2,5(10),8(14)-trien-17β-ol in 5 ml. of pyridine is combined with 310 mg. of chromium trioxide in 5 ml. of pyridine. The reaction flask is stoppered, the contents are mixed thoroughly and allowed to stand at room temperature overnight. The mixture is poured into water and extracted three times with a benzene-ether solvent. The combined extracts are washed with water, dried over anhydrous magnesium sulfate, and filtered. The solvent is removed from the solution by distillation under reduced pressure. The residue is 3-methoxyestra-2,5(10),8(14)-trien-17-one and is crystallized from methanol.

Example 6.—3-methoxyestra-2,5(10),8(14)-trien-17-one

A solution of 255 mg. of 3-methoxyestra-2,5(10),8(14)-trien-17β-ol, 306 mg. of freshly distilled aluminum isopropoxide in 13 ml. of dry toluene is heated for five minutes on a steam bath under an atmosphere of nitrogen. The solution is cooled in ice and 2.6 ml. of distilled cyclohexanone are added. The solution is again heated on a steam bath under nitrogen for 40 minutes and then cooled in ice. A saturated aqueous solution of Rochelle salts is added with vigorous shaking and the solution is extracted with ether. The ether is removed by evaporation and the remaining solution is steam distilled. The residue is extracted with ether and the ether is dried over magnesium sulfate, filtered, and evaporated to dryness under reduced pressure. The residue is 3-methoxyestra-2,5(10),8(14)-trien-17-one and is crystallized from methanol.

Example 7.—17,17-ethylenedioxyestra-5(10),8(14)-dien-3-one

A solution of 1.5 g. of oxalic acid in 15 ml. of water is added to a solution of 1 g. of 3-methoxy-17,17-ethylenedioxyestra-2,5(10),8(14)-triene in 20 ml. of tetrahydrofuran and 100 ml. of methanol. The reaction mixture is allowed to stand at room temperature for one hour and then a slight excess of 5% aqueous potassium bicarbonate solution is added. The organic solvents are removed from the resulting mixture by distillation under reduced pressure and the residue is extracted with ether, the extract is washed with saturated aqueous sodium chloride solution, dried over magnesium sulfate, filtered, and concentrated to dryness under reduced pressure. The residue is 17,17-ethylenedioxyestra-5(10),8(14)-dien-3-one and is crystallized from methanol.

Example 8.—Estra-5(10),8(14)-dien-3-one-17β-ol

A solution of 1.5 g. of oxalic acid in 15 ml. of water is added to a solution of 1 g. of 3-methoxyestra-2,5(10),8(14)-trien-17β-ol in 20 ml. of tetrahydrofuran and 100 ml. of methanol. The reaction mixture is allowed to stand at room temperature for one hour and then a slight excess of 5% aqueous potassium bicarbonate solution is added. The organic solvents are removed from the resulting mixture by distillation under reduced pressure and the residue is extracted with ether, the extract is washed with saturated aqueous sodium chloride solution, dried over magnesium sulfate, filtered, and concentrated to dryness under reduced pressure. The residue is estra-5(10),8(14)-dien-3-one-17β-ol and is crystallized from methanol.

Example 9.—Estra-5(10),8(14)-diene-3,17-dione

A solution of 300 mg. of estra-5(10),8(14)-dien-3-one-17β-ol in solution in 5 ml. of pyridine is combined with 310 mg. of chromium trioxide in 5 ml. of pyridine. The reaction mixture is stoppered, the contents are mixed thoroughly and allowed to stand at room temperature overnight. The mixture is poured into water and extracted three times with a benzene-ether solvent. The combined extracts are washed with water, dried over anhydrous magnesium sulfate and filtered. The solvent is removed from the solution by distillation under reduced pressure. The residue is estra-5(10),8(14)-diene-3,17-dione and is crystallized from methanol.

Example 10.—Estra-5(10),8(14)-diene-3,17-dione

A solution of 255 mg. of estra-5(10),8(14)-dien-3-one 17β-ol, 306 mg. of freshly distilled aluminum isopropoxide in 13 ml. of dry toluene is heated for five minutes on a steam bath under an atmosphere of nitrogen. The solution is cooled in ice and 2.6 ml. of distilled cyclohexanone are added. The solution is again heated on a steam bath under nitrogen for 40 minutes and then cooled in ice. A saturated aqueous solution of Rochelle salts is added with vigorous shaking and the solution is extracted with ether. The ether is removed by evaporation and the remaining solution is steam distilled. The residue is extracted with ether and the ether is dried over magnesium sulfate, filtered, and evaporated to dryness under reduced pressure. The residue is estra-5(10),8(14)-diene-3,17-dione and is crystallized from methanol.

Example 11.—Estra-4,9,8(14)-triene-3,17-dione

One molecular equivalent of bromine in solution in five milliliters of pyridine is added to 500 mg. of estra-5(10), 8(14)-diene-3,17-dione in solution in 20 ml. of pyridine. The reaction mixture is stirred for two hours at room temperature and poured into ice water. The aqueous mixture is extracted with ether, the ether extract is washed with water, dried over anhydrous sodium sulfate, filtered, and the ether is removed by distillation under reduced pressure. The residue is estra-4,9,8(14)-triene-3,17-dione and is crystallized from methanol.

Example 12.—Estra-4,9,8(14)-trien-3-one-17β-ol

One molecular equivalent of bromine in solution in 5 ml. of pyridine is added to 500 mg. of estra-5(10),8(14)-dien-3-one-17β-ol in solution in 20 ml. of pyridine. The reaction mixture is stirred for two hours at room temperature and poured into ice water. The aqueous mixture is extracted with ether, the ether extract is washed with water, dried over anyhdrous sodium sulfate, filtered, and the ether is removed by distillation under reduced pressure. The residue is estra-4,9,8(14)-trien-3-one-17β-ol and is crystallized from methanol.

Example 13.—17,17-ethylenedioxyestra-4,9,8(14)-trien-3-one

One molecular equivalent of bromine in solution in 5 ml. of pyridine is added to 500 mg. of 17,17-ethylenedioxyestra 5(10),8(14)-dien-3-one in solution in 20 ml. of pyridine. The reaction mixture is stirred for two hours at room temperature and poured into ice water. The aqueous mixture is extracted with ether, the ether extract is washed with water, dried over anhydrous sodium sulfate, filtered, and the ether is removed by distillation under reduced pressure. The residue is 17,17 - ethylenedioxyestra-4,9,8(14)-trien-3-one and is crystallized from methanol.

Example 14.—Estra-5(10),8(14)-diene-3,17-dione

A solution of 500 mg. of 17,17-ethylenedioxyestra-5(10),8(14)-dien-3-one in 15 ml. of acetic acid and 15 ml. of water is heated on a steam bath at a temperature of from 90° to 95° C. for three hours. The mixture is concentrated nearly to dryness under reduced pressure. Water is added to the concentrate and the resulting mixture is extracted with ether. The ether extract is washed with 5% aqueous potassium bicarbonate solution, washed with saturated aqueous sodium chloride solution, dried over anhydrous magnesium sulfate, filtered, and concentrated to dryness under reduced pressure. The residue is estra - 5(10),8(14)-diene-3,17-dione and is crystallized from methanol.

Example 15.—Estra-4,9,8(14)-triene-3,17-dione

A solution of 300 mg. of estra-4,9,8(14)-trien-3-one-17β-ol in 5 ml. of pyridine is combined with 310 mg. of chromium trioxide in 5 ml. of pyridine. The reaction flask is stoppered, the contents are mixed thoroughly and allowed to stand at room temperature overnight. The mixture is poured into water and extracted three times with a benzene-ether solvent. The combined extracts are washed with water, dried over anhydrous magnesium sulfate, and filtered. The solvent is removed from the solution by distillation under reduced pressure. The residue is estra-4,9,8(14)-triene - 3,17 - dione, and is crystallized from methanol.

Example 16.—3-methoxy-13β-ethylgona-2,5(10),8(14)-trien-17β-ol

A solution of 1 g. of 3-methoxy-13β-ethylgona-1,3,5(10),8,14-pentaen-17-one in 25 ml. of tetrahydrofuran and 30 ml. of ether is added to 150 ml. of anhydrous liquid ammonia while the temperature of the ammonia is within the range of —50° to —60° C. Eighty milliliters of anhydrous ethanol is added with vigorous stirring and then 4 g. of lithium are added in small pieces over a 10 minute period. The reaction mixture is allowed to stand for 15 minutes and then 10 ml. of ethanol are added. The reaction mixture is allowed to come slowly to room temperature so that the ammonia evaporates overnight. One hundred milliliters of water are added to the residue and the mixture is concentrated to dryness under reduced pressure to remove most of the ethanol. The residual mixture is extracted with chloroform, the extract is washed with saturated aqueous sodium chloride solution, dried over magnesium sulfate, filtered, and concentrated to dryness under reduced pressure. One gram of crude 3-methoxy-13β-ethylgona - 2,5(10),8(14)-trien-17β-ol is obtained. The crude product is purified by crystallization from methanol.

Example 17.—3-tetrahydropyranyloxy-13β-isopropylgona-2,5(10),8(14)-trien-17β-ol A solution of 1 g. of 3-tetrahydropyranyloxy-13β-isopropylgona-1,3,5(10),8,14-pentaen-17β-ol in 50 ml. of tetrahydrofuran is added to 150 ml. of anhydrous liquid ammonia while the temperature of the ammonia is within the range of from —50° to —60° C. One hundred milliliters of tertiary-butanol is added with vigorous stirring and then 12 g. of sodium are added over a 15 minute period. The reaction mixture is allowed to stand for 20 minutes and then 15 ml. of tertiary-butanol are added. The reaction mixture is allowed to come slowly to room temperature so that the ammonia evaporates overnight. One hundred milliliters of water are added to the residue and the mixture is concentrated to dryness under reduced pressure to remove most of the solvent. The residual mixture is extracted with chloroform, the extract is washed with saturated aqueous sodium chloride solution, dried over magnesium sulfate, filtered, and concentrated to dryness under reduced pressure. One gram of crude 3 - tetrahydropyranyloxy-13β-isopropylgona - 2,5(10),8(14)-trien-17β-ol is obtained. The crude product is purified by crystallization from methanol.

Example 18.—3-ethoxy-13β-n-butylgona-2,5(10),8(14)-trien-17β-ol

A solution of 1 g. of 3-ethoxy-13β-n-butylgona-1,3,5(10),8,14-pentaen-17β-ol in 25 ml. of tetrahydrofuran and 30 ml. of each ether is added to 150 ml. of anhydrous liquid ammonia while the temperature of the ammonia is within the range of —50° to —60° C. Eighty milliliters of anhydrous ethanol is added with vigorous stirring and then 4 g. of lithium are added in small pieces over a 10 minute period. The reaction mixture is allowed to stand for 15 minutes and then 10 ml. of ethanol are added. The reaction mixture is allowed to come slowly to room temperature so that the ammonia evaporates overnight. One hundred milliliters of water are added to the residue and the mixture is concentrated to dryness under reduced pressure to remove most of the ethanol. The residual mixture is extracted with chloroform, the extract is washed with saturated aqueous sodium chloride solution, dried over magnesium sulfate, filtered, and concentrated to dryness under reduced pressure. One gram of crude 3-ethoxy-13β-n-butylgona-2,5(10),8(14)-trien-17β-ol is obtained. The crude product is purified by crystallization from methanol.

Example 19.—13β-ethylgona-5(10),8(14)-dien-3-one-17β-ol

A solution of 1.5 g. of oxalic acid in 15 ml. of water is added to a solution of 1 g. of 3-methoxy-13β-ethylgona-2,5(10),8(14)-trien-17β-ol in 20 ml. of tetrahydrofuran and 100 ml. of methanol. The reaction mixture is allowed to stand at room temperature for one hour and then a slight excess of 5% aqueous potassium bicarbonate solution is added. The organic solvents are removed from the resulting mixture by distillation under reduced pressure and the residue is extracted with ether, the extract is washed with saturated aqueous sodium chloride solution, dried over magnesium sulfate, filtered, and concentrated to dryness under reduced pressure. The residue is 13β-ethylgona-5(10),8(14)-dien-3-one-17β-ol and is crystallized from methanol.

Example 20.—13β-isopropylgona-5(10),8(14)-dien-3-one-17β-ol

A solution of 1.5 g. of oxalic acid in 15 ml. of water is added to a solution of 1 g. of 3-tetrahydropyranyloxy-13β-isopropylgona-2,5(10),8(14)-trien-17β-ol in 20 ml. of tetrahydrofuran and 100 ml. of methanol. The reaction mixture is allowed to stand at room temperature for one hour and then a slight excess of 5% aqueous potassium bicarbonate solution is added. The organic solvents are removed from the resulting mixture by distillation under reduced pressure and the residue is extracted with ether, the extract is washed with saturated aqueous sodium chloride solution, dried over magnesium sulfate, filtered, and concentrated to dryness under reduced pressure. The residue is 13β-isopropylgona-5(10),8(14)-dien-3-on-17β-ol, and is crystallized from methanol.

Example 21.—13β-n-butylgona-5(10),8(14)-dien-3-on-17β-ol

A solution of 1.5 g. of oxalic acid in 15 ml. of water is added to a solution of 1 g. of 3-ethoxy-13β-n-butylgona-2,5(10),8(14)-trien-17β-ol in 20 ml. of tetrahydrofuran and 100 ml. of methanol. The reaction mixture is allowed to stand at room temperature for one hour and then a slight excess of 5% aqueous potassium bicarbonate solution is added. The organic solvents are removed from the resulting mixture by distillation under reduced pressure and the residue is extracted with ether, the extract is washed with saturated aqueous sodium chloride solution, dried over magnesium sulfate, filtered, and concentrated to dryness under reduced pressure. The residue is 13β-n-butylgona-5(10),8(14)-dien-3-on-17β-ol and is crystallized from methanol.

Example 22.—13β-ethylgona-4,9,8(14)-trien-3-on-17β-ol

One molecular equivalent of bromine in solution in five milliliters of pyridine is added to 500 mg. of 13β-ethylgona-5(10),8(14)-dien-3-on-17β-ol in solution in 20 ml. of pyridine. The reaction mixture is stirred for two hours at room temperature and poured into ice water. The aqueous mixture is extracted with ether, the ether extract is washed with water, dried over anhydrous sodium sulfate, filtered, and the ether is removed by distillation under reduced pressure. The residue is 13β-ethylgona-4,9,8(14)-trien-3-on-17β-ol and is crystallized from methanol.

Example 23.—13β-isopropylgona-4,9,8(14)-trien-3-on-17β-ol

One molecular equivalent of bromine in solution in five milliliters of pyridine is added to 500 mg. of 13β-isopropylgona-5(10),8(14)-dien-3-on-17β-ol in solution in 20 ml. of pyridine. The reaction mixture is stirred for two hours at room temperature and poured into ice water. The aqueous mixture is extracted with ether, the ether extract is washed with water, dried over anhydrous sodium sulfate, filtered, and the ether is removed by distillation under reduced pressure. The residue is 13β-isopropylgona-4,9,8(14)-trien-3-on-17β-ol and is crystallized from methanol.

Example 24.—13β-n-butylgona-4,9,8(14)-trien-3-on-17β-ol

One molecular equivalent of bromine in solution in five milliliters of pyridine is added to 500 mg. of 13β-n-butylgona-5(10),8(14)-dien-3-on-17β-ol in solution in 20 ml. of pyridine. The reaction mixture is stirred for two hours at room temperature and poured into ice water. The aqueous mixture is extracted with ether, the ether extract is washed with water, dried over anhydrous sodium sulfate, filtered, and the ether is removed by distillation under reduced pressure. The residue is 13β-n-butylgona-4,9,8(14)-trien-3-on-17β-ol and is crystallized from methanol.

Example 25.—13β-ethylgona-4,9,8(14)-triene-3,17-dione

A solution of 300 mg. of 13β-ethylgona-4,9,8(14)-trien-3-on-17β-ol in 5 ml. of pyridine is combined with 310 mg. of chromium trioxide in 5 ml. of pyridine. The reaction flask is stoppered, the contents are mixed thoroughly and allowed to stand at room temperature overnight. The mixture is poured into water and extracted three times with a benzene-ether solvent. The combined extracts are washed with water, dried over anhydrous magnesium sulfate, and filtered. The solvent is removed from the solution by distillation under reduced pressure. The residue is 13β-ethylgona-4,9,8(14)-triene-3,17-dione and is crystallized from methanol.

Example 26.—13β-isopropylgona-4,9,8(14)-triene-3,17-dione

A solution of 300 mg. of 13β-isopropylgona-4,9,8(14)-trien-3-on-17β-ol in 5 ml. of pyridine is combined with 310 mg. of chromium trioxide in 5 ml. of pyridine. The reaction flask is stoppered, the contents are mixed thoroughly and allowed to stand at room temperature overnight. The mixture is poured into water and extracted three times with a benzene-ether solvent. The combined extracts are washed with water, dried over anhydrous magnesium sulfate, and filtered. The solvent is removed from the solution by distillation under reduced pressure. The residue is 13β-isopropylgona-4,9,8(14)-triene-3,17-dione, and is crystallized from methanol.

Example 27.—13β-n-butylgona-4,9,8(14)-triene-3,17-dione

A solution of 300 mg. of 13β-n-butylgona-4,9,8(14)-trien-3-on-17β-ol in 5 ml. of pyridine is combined with 310 mg. of chromium trioxide in 5 ml. of pyridine. The reaction flask is stoppered, the contents are mixed thoroughly and allowed to stand at room temperature overnight. The mixture is poured into water and extracted three times with a benzene-ether solvent. The combined extracts are washed with water, dried over anhydrous magnesium sulfate, and filtered. The solvent is removed from the solution by distillation under reduced pressure. The residue is 13β-n-butylgona-4,9,8(14)-triene-3,17-dione, and is crystallized from methanol.

Various changes and modifications may be made in carrying out the present invention without departing from the spirit and scope thereof. Insofar as these changes and modifications are within the purview of the annexed claims, they are to be considered as part of our invention.

What is claimed is:

1. A process for the preparation of a compound of the formula:

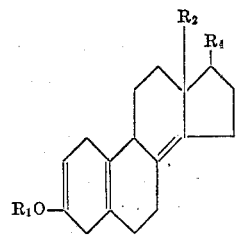

wherein $R_1$ is a lower alkyl, cycloaliphatic, or tetrahydropyronyl substituent, $R_2$ is a lower alkyl radical, and $R_4$ is a β-hydroxy, acetal or ketal group, which comprises reacting a solution in an ethereal organic solvent and liquid ammonia of a compound of the formula:

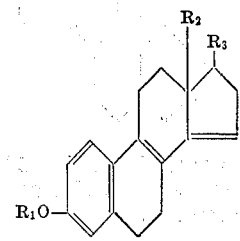

wherein $R_1$ and $R_2$ have the same significance as above and $R_3$ is a β-hydroxy, keto, acetal or ketal group, with an alkali metal.

2. A process according to claim 1 in which the organic solvent is a mixture of tetrahydrofuran and the alkali metal is lithium.

3. A process according to claim 1 in which $R_1$ is methyl, $R_2$ is methyl and $R_3$ and $R_4$ are a 17,17-ethylenedioxy group.

4. A process according to claim 1 in which $R_1$ is methyl, $R_2$ is methyl, $R_3$ is a keto group, and $R_4$ is a β-hydroxy group.

5. A process according to claim 1 in which $R_1$ is methyl, $R_2$ is methyl, and $R_3$ and $R_4$ are each a β-hydroxy group.

6. A process for the preparation of a compound of the formula:

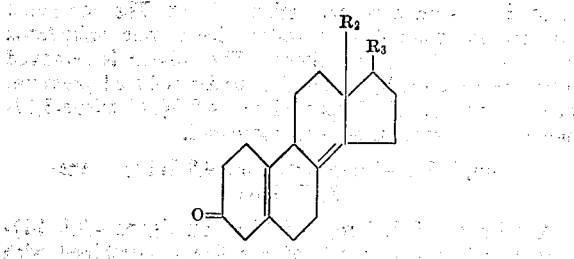

wherein $R_2$ is a lower alkyl radical, and $R_3$ is a β-hydroxy, keto, acetal or ketal group, which comprises treating a solution in an alcoholic organic solvent of a compound of the formula:

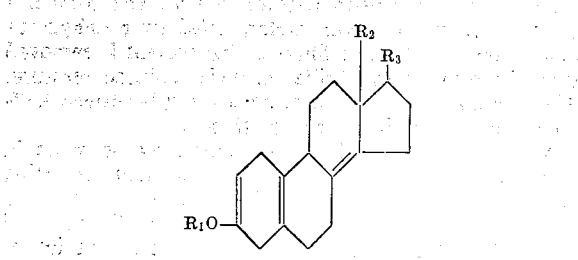

wherein $R_1$ is a lower alkyl, cycloaliphatic, or tetrahydropyranyl substituent, and $R_2$ and $R_3$ have the same significance as above, with oxalic acid.

7. A process according to claim 6 in which the organic solvent is composed of tetrahydrofuran and methanol, $R_1$ is methyl, $R_2$ is methyl, and $R_3$ is a 17,17-ethylenedioxy group.

8. A process according to claim 6 in which the organic solvent is composed of tetrahydrofuran and methanol, $R_1$ is methyl, $R_2$ is methyl, and $R_3$ is a keto group.

9. A process according to claim 6 in which the organic solvent is composed of tetrahydrofuran and methanol, $R_1$ is methyl, $R_2$ is methyl and $R_3$ is a β-hydroxy group.

10. A process for the preparation of a compound of the formula:

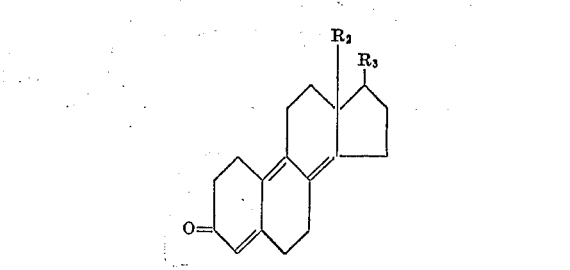

wherein $R_2$ is a lower alkyl radical, and $R_3$ is a β-hydroxy, keto, acetal or ketal group, which comprises reacting a compound of the formula:

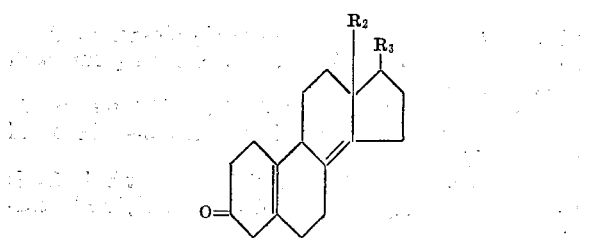

wherein $R_2$ and $R_3$ have the same significance as above, in pyridine solution with an equi-molar amount of bromine.

11. A process according to claim 10 in which $R_2$ is methyl, and $R_3$ is a 17,17-ethylenedioxy group.

12. A process according to claim 10 in which $R_3$ is a β-hydroxy group.

13. A process according to claim 10 in which $R_3$ is a keto group.

14. A process for the preparation of Compound IV of the formula:

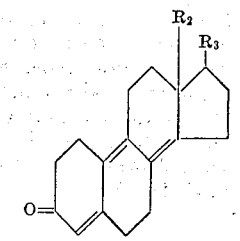

wherein $R_2$ is a lower alkyl radical, and $R_3$ is a β-hydroxy, acetal or ketal group, which comprises the steps of reacting a solution in an ethereal organic solvent and liquid ammonia of Compound I of the formula:

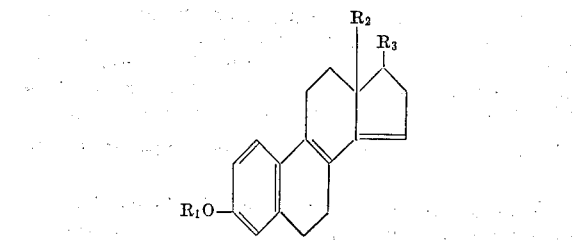

wherein $R_1$ is a lower alkyl, cycloaliphatic, or tetrahydropyranyl substituent, $R_2$ has the same significance as above, and $R_3$ is a β-hydroxy, keto, acetal or ketal group, with an alkali metal to provide Compound II of the formula:

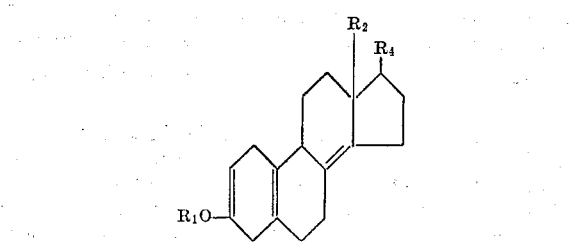

wherein $R_1$ and $R_2$ have the same significance as above and $R_4$ is a β-hydroxy, acetal or ketal group; treating Compound II in a solution in an alcoholic organic solvent with oxalic acid to provide Compound III of the formula:

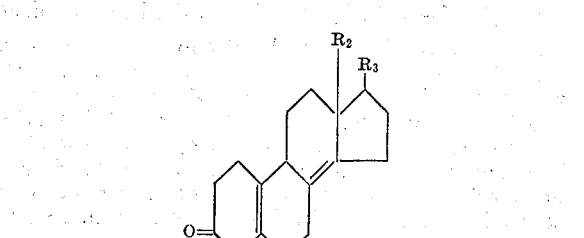

wherein $R_2$ has the same significance as above and $R_3$ is a β-hydroxy, acetal or ketal group; and reacting Compound III in pyridine solution with an equi-molar amount of bromine.

15. A process according to claim 14 in which the β-hydroxy group on the 17-carbon atom of Compound II is oxidized in a separate step to a keto group and $R_3$ in Compounds III and IV is a β-hydroxy, keto, acetal or ketal group.

16. A process according to claim 14 having the additional step of removing an 17-acetal or 17-ketal group of Compound IV by heating a solution of that compound in aqueous acetic acid under nitrogen at a temperature of 90° C. for a period of from one to four hours to provide a 17-keto group; or oxidizing a 17 β-hydroxy group of Compound IV to provide a keto group.

17. A compound of the formula:

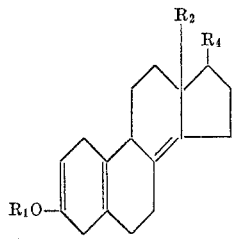

wherein $R_1$ is a lower alkyl, cycloaliphatic, or a tetrahydropyranyl substituent, $R_2$ is a lower alkyl group; and $R_4$ is a β-hydroxy, keto, acetal or ketal group.

18. A compound according to claim 17 in which $R_1$ is methyl, $R_2$ is methyl, and $R_4$ is a β-hydroxy, keto, acetal or ketal group.

19. A compound of the formula:

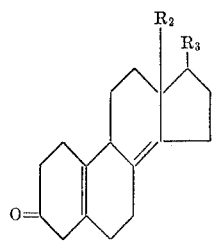

wherein $R_2$ is a lower alkyl group and $R_3$ is a β-hydroxy, keto, acetal or ketal group.

20. A compound according to claim 19 wherein $R_2$ is methyl, and $R_3$ is a β-hydroxy, keto, acetal or ketal group.

References Cited

UNITED STATES PATENTS 3,067,214   12/1962   Oberster et al. _____ 260—397.4

OTHER REFERENCES

Chemistry of Natural Compounds (1965), page 132.

ELBERT L. ROBERTS, *Primary Examiner.*